US012438682B2

(12) United States Patent
Bhamri et al.

(10) Patent No.: US 12,438,682 B2
(45) Date of Patent: Oct. 7, 2025

(54) INDICATING A SUBCARRIER SPACING VALUE

(71) Applicant: Lenovo (Singapore) Pte. Ltd., New Tech Park (SG)

(72) Inventors: Ankit Bhamri, Rödermark (DE); Ali Ramadan Ali, Kraiburg am Inn (DE); Karthikeyan Ganesan, Kronberg im Taunus (DE); Vijay Nangia, Woodridge, IL (US); Sher Ali Cheema, Ilmenau (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 415 days.

(21) Appl. No.: 18/021,652

(22) PCT Filed: Aug. 18, 2021

(86) PCT No.: PCT/IB2021/057609
§ 371 (c)(1),
(2) Date: Feb. 16, 2023

(87) PCT Pub. No.: WO2022/038545
PCT Pub. Date: Feb. 24, 2022

(65) Prior Publication Data
US 2023/0396400 A1 Dec. 7, 2023

Related U.S. Application Data

(60) Provisional application No. 63/067,088, filed on Aug. 18, 2020.

(51) Int. Cl.
*H04W 4/00* (2018.01)
*H04L 1/00* (2006.01)
*H04L 5/00* (2006.01)

(52) U.S. Cl.
CPC ............ *H04L 5/0094* (2013.01); *H04L 1/001* (2013.01); *H04L 5/0044* (2013.01)

(58) Field of Classification Search
CPC ..... H04L 5/0094; H04L 1/001; H04L 5/0044; H04L 5/0007; H04L 5/001; H04L 5/006
See application file for complete search history.

(56) References Cited

U.S. PATENT DOCUMENTS

| 2011/0142151 A1 | 6/2011 | Zhang et al. |
| 2020/0014512 A1 | 1/2020 | Ramadan et al. |

(Continued)

FOREIGN PATENT DOCUMENTS

| CA | 3119893 A1 * | 5/2020 | ........... H04B 17/373 |
| CN | 110235464 A * | 9/2019 | ........... H04L 1/1854 |

(Continued)

OTHER PUBLICATIONS

WO-2022038545-A1 (Year: 2022).*

(Continued)

*Primary Examiner* — Thai Dinh Hoang
(74) *Attorney, Agent, or Firm* — Kunzler Bean & Adamson

(57) ABSTRACT

Apparatuses, methods, and systems are disclosed for indicating a subcarrier spacing value. One method includes receiving a configuration from a network device for a report including an indication of at least one subcarrier spacing value for transmitting a physical channel, receiving the physical channel, or a combination thereof. The method includes, in response to receiving the configuration, estimating the at least one subcarrier spacing value by calculating a Doppler spread, an average delay, a delay spread, a phase noise power, an inter carrier interference level, or some (Continued)

combination thereof. The method includes transmitting the report including the indication of the at least one subcarrier spacing value.

20 Claims, 6 Drawing Sheets

(56) References Cited

U.S. PATENT DOCUMENTS

| | | | | |
|---|---|---|---|---|
| 2021/0359807 A1* | 11/2021 | Zewail | .................. | H04L 5/0051 |
| 2021/0377984 A1* | 12/2021 | Park | ...................... | H04L 5/0044 |
| 2022/0038893 A1* | 2/2022 | Narasimha | ............ | H04L 63/166 |
| 2022/0085908 A1* | 3/2022 | Shaked | ............... | H04L 27/2646 |

FOREIGN PATENT DOCUMENTS

| | | | | | |
|---|---|---|---|---|---|
| CN | 110536315 A | * | 12/2019 | ............ | H04W 24/02 |
| WO | 2018227209 A1 | | 12/2018 | | |
| WO | 2019125234 A1 | | 6/2019 | | |
| WO | WO-2021210943 A1 | * | 10/2021 | ............. | G06N 3/006 |
| WO | WO-2022038545 A2 | * | 2/2022 | ............. | H04L 1/001 |
| WO | WO-2022075695 A1 | * | 4/2022 | ........... | H04B 7/0626 |
| WO | WO-2022154493 A1 | * | 7/2022 | ............. | H04B 7/022 |
| WO | WO-2023011097 A1 | * | 2/2023 | ............... | H04L 1/16 |

OTHER PUBLICATIONS

PCT/IB2021/057609, "Notification of Transmittal of the International Search Report and the Written Opinion of the International Searching Authority, or the Declaration", International Searching Authority, Feb. 18, 2022, pp. 1-25.

Lenovo et al., "PDSCH/PUSCH scheduling enhancements for NR from 52.6 GHz to 71GHz", 3GPP TSG RAN WG1 #104-e R1-2100061, Jan. 25-Feb. 5, 2021, pp. 1-9.

Qualcomm, "New WID on Extending current NR operation to 71 GHz", 3GPP TSG RAN Meeting #86 RP-193229, Dec. 9-12, 2019, pp. 1-5.

Intel Corporation., "New SID: Study on supporting NR from 52.6GHz to 71 Ghz", 3GPP TSG RAN Meeting #86 RP-193259, Dec. 9-12, 2019, pp. 1-3.

Soni et al., "Adaptive Numerology—A solution to address the demanding QoS in 5G-V2X", IEEE (WCNC), 2018, pp. 1-6.

3GPP, "3rd Generation Partnership Project; Technical Specification Group Radio Access Network; NR; Requirements for support of radio resource management (Release 16)", 3GPP TS 38.133 V16.4.0, Jun. 2020, pp. 1-1463.

3GPP, "3rd Generation Partnership Project; Technical Specification Group Radio Access Network; NR; Physical channels and modulation (Release 16)", 3GPP TS 38.211 V16.2.0, Jun. 2020, pp. 1-131.

3GPP, "3rd Generation Partnership Project; Technical Specification Group Radio Access Network; NR; Multiplexing and channel coding (Release 16)", 3GPP TS 38.212 V16.2.0, Jun. 2020, pp. 1-151.

3GPP, "3rd Generation Partnership Project; Technical Specification Group Radio Access Network; NR; Physical layer procedures for control (Release 16)", 3GPP TS 38.213 V16.2.0, Jun. 2020, pp. 1-176.

3GPP, "3rd Generation Partnership Project; Technical Specification Group Radio Access Network; NR; Physical layer procedures for data (Release 16)", 3GPP TS 38.214 V16.2.0, Jun. 2020, pp. 1-163.

3GPP, "3rd Generation Partnership Project; Technical Specification Group Radio Access Network; NR; Medium Access Control (MAC) protocol specification (Release 16)", 3GPP TS 38.321 V16.1.0, Jul. 2020, pp. 1-151.

* cited by examiner

INDICATING A SUBCARRIER SPACING VALUE

CROSS-REFERENCE TO RELATED APPLICATIONS

This application claims priority to U.S. Patent Application Ser. No. 63/067,088 entitled "APPARATUSES, METHODS, AND SYSTEMS FOR UE-INITIATED SUBCARRIER SPACING ADAPTATION" and filed on Aug. 18, 2020 for Ankit Bhamri, which is incorporated herein by reference in its entirety.

FIELD

The subject matter disclosed herein relates generally to wireless communications and more particularly relates to indicating a subcarrier spacing value.

BACKGROUND

In certain wireless communications networks, a subcarrier spacing may not be optimal for a certain communication. In such networks, a network device may not have all information needed to select a best subcarrier spacing.

BRIEF SUMMARY

Methods for indicating a subcarrier spacing value are disclosed. Apparatuses and systems also perform the functions of the methods. One embodiment of a method at a device includes receiving a configuration from a network device for a report including an indication of at least one subcarrier spacing value for transmitting a physical channel, receiving the physical channel, or a combination thereof. In some embodiments, the method includes, in response to receiving the configuration, estimating the at least one subcarrier spacing value by calculating a Doppler spread, an average delay, a delay spread, a phase noise power, an inter carrier interference level, or some combination thereof. In certain embodiments, the method includes transmitting the report including the indication of the at least one subcarrier spacing value.

One apparatus for indicating a subcarrier spacing value includes a device. In some embodiments, the apparatus includes a receiver that receives a configuration from a network device for a report including an indication of at least one subcarrier spacing value for transmitting a physical channel, receiving the physical channel, or a combination thereof. In various embodiments, the apparatus includes a processor that, in response to receiving the configuration, estimates the at least one subcarrier spacing value by calculating a Doppler spread, an average delay, a delay spread, a phase noise power, an inter carrier interference level, or some combination thereof. In certain embodiments, the apparatus includes a transmitter that transmits the report including the indication of the at least one subcarrier spacing value.

Another embodiment of a method at a network device for indicating a subcarrier spacing value includes transmitting a configuration to a device for a report including an indication of at least one subcarrier spacing value for transmitting a physical channel, receiving the physical channel, or a combination thereof. In some embodiments, the method includes receiving the report including the indication of the at least one subcarrier spacing value. The at least one subcarrier spacing value is estimated based on a Doppler spread, an average delay, a delay spread, a phase noise power, an inter carrier interference level, or some combination thereof.

Another apparatus for indicating a subcarrier spacing value includes a network device. In some embodiments, the apparatus includes a transmitter that transmits a configuration to a device for a report including an indication of at least one subcarrier spacing value for transmitting a physical channel, receiving the physical channel, or a combination thereof. In various embodiments, the apparatus includes a receiver that receives the report including the indication of the at least one subcarrier spacing value. The at least one subcarrier spacing value is estimated based on a Doppler spread, an average delay, a delay spread, a phase noise power, an inter carrier interference level, or some combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
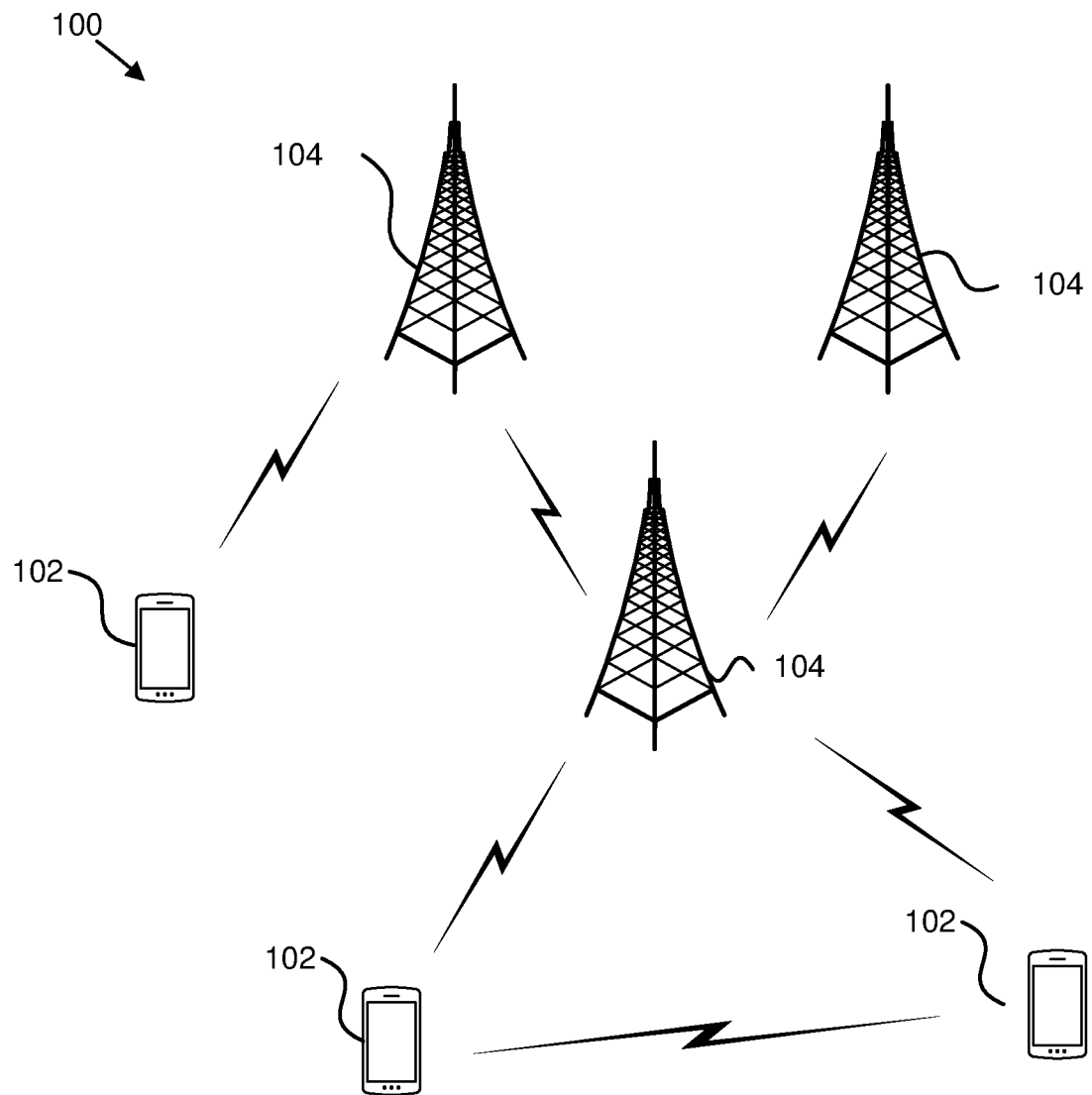
FIG. 1 is a schematic block diagram illustrating one embodiment of a wireless communication system for indicating a subcarrier spacing value.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for indicating a subcarrier spacing value. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive a configuration from a network device for a report including an indication of at least one subcarrier spacing value for transmitting a physical channel, receiving the physical channel, or a combination thereof. In some embodiments, the remote unit 102 may, in response to receiving the configuration, estimate the at least one subcarrier spacing value by calculating a Doppler spread, an average delay, a delay spread, a phase noise power, an inter carrier interference level, or some combination thereof. In certain embodiments, the remote unit 102 may transmit the report including the indication of the at least one subcarrier spacing value. Accordingly, the remote unit 102 may be used for indicating a subcarrier spacing value.

In certain embodiments, a network unit 104 may transmit a configuration to a device for a report including an indication of at least one subcarrier spacing value for transmitting a physical channel, receiving the physical channel, or a combination thereof. In some embodiments, the network unit 104 may receive the report including the indication of the at least one subcarrier spacing value. The at least one subcarrier spacing value is estimated based on a Doppler spread, an average delay, a delay spread, a phase noise power, an inter carrier interference level, or some combination thereof. Accordingly, the network unit 104 may be used for indicating a subcarrier spacing value.

Figure 2:
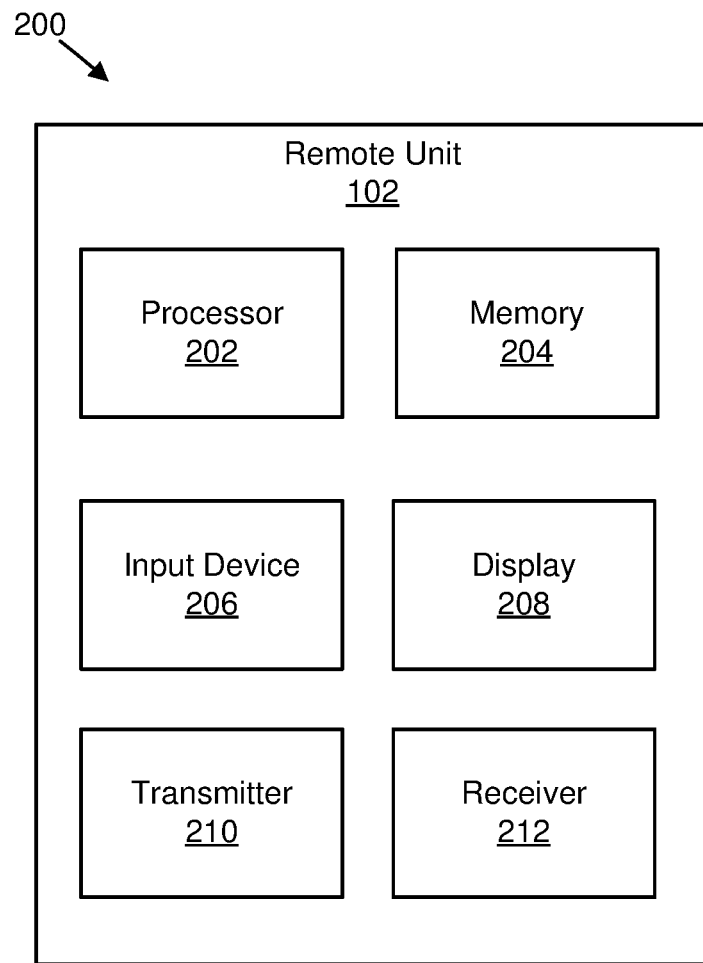
FIG. 2 is a schematic block diagram illustrating one embodiment of an apparatus that may be used for indicating a subcarrier spacing value.

FIG. 2 depicts one embodiment of an apparatus 200 that may be used for indicating a subcarrier spacing value. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212 receives a configuration from a network device for a report including an indication of at least one subcarrier spacing value for transmitting a physical channel, receiving the physical channel, or a combination thereof. In various embodiments, the processor 202, in response to receiving the configuration, estimates the at least one subcarrier spacing value by calculating a Doppler spread, an average delay, a delay spread, a phase noise power, an inter carrier interference level, or some combination thereof. In certain embodiments, the transmitter 210 transmits the report including the indication of the at least one subcarrier spacing value.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
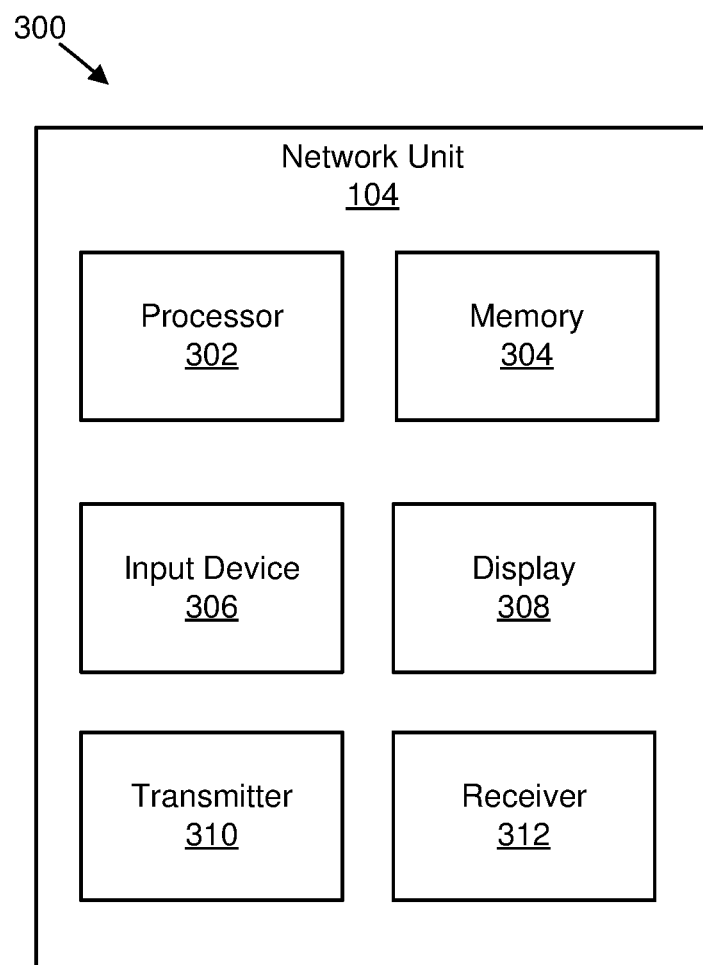
FIG. 3 is a schematic block diagram illustrating one embodiment of an apparatus that may be used for indicating a subcarrier spacing value.

FIG. 3 depicts one embodiment of an apparatus 300 that may be used for indicating a subcarrier spacing value. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310 transmits a configuration to a device for a report including an indication of at least one subcarrier spacing value for transmitting a physical channel, receiving the physical channel, or a combination thereof. In various embodiments, the receiver 312 receives the report including the indication of the at least one subcarrier spacing value. The at least one subcarrier spacing value is estimated based on a Doppler spread, an average delay, a delay spread, a phase noise power, an inter carrier interference level, or some combination thereof.

In certain embodiments, user equipment ("UE") initiated adaptive subcarrier spacing for link adaptation for data and/or control transmissions may be enhanced. In some embodiments, higher subcarrier spacing ("SCS") values beyond 120 kHz may be used for a frequency range ("FR") beyond 52.6 GHz to compensate for phase noise. However, selection of SCS values based on the frequency range may not be the only criteria. As may be appreciated, the channel condition and selection of a modulation and coding scheme ("MCS") may play an important role in determining the SCS value. For example, if a channel condition is not very good (e.g., a low signal to noise ratio ("SNR") range), lower SCS values of 120 kHz or 240 kHz may be better as noise is more pronounced than the inter-carrier interference caused by phase noise. If channel conditions are moderate (e.g., mid SNR range), then a slightly higher SCS value, such as 480 kHz, may be better. For very good channel conditions (e.g., high SNR), then a 960 kHz SCS value may be best (e.g., phase noise dominates and so reduction in phase noise interference by increased subcarrier spacing has better performance provided a cyclic prefix ("CP") is sufficient), all considering similar mobile speed. In various embodiments, performance requirements in terms of target block error rate ("BLER") and/or throughput may be critical in determining a suitable value of SCS along with other parameters such as MCS, rank, and so forth.

In some embodiments, since a UE estimates channel conditions such as phase noise, inter-cell interference ("ICI"), Doppler effect, a channel quality indication ("CQI"), and so forth, and some of the estimates are based on a supported receiver algorithm and so the UE is well aware of the channel conditions compared to a gNB. As may be appreciated, reporting a large set of measurements to the gNB may use a large amount of overhead. In various embodiments, SCS value selection may be based on UE estimated channel conditions such as phase noise, ICI, CQI, Doppler, and so forth and may introduce a corresponding indication to report a new SCS in a physical layer ("PHY").

It should be noted that the term numerology and SCS may be used interchangeably herein.

Figure 4:
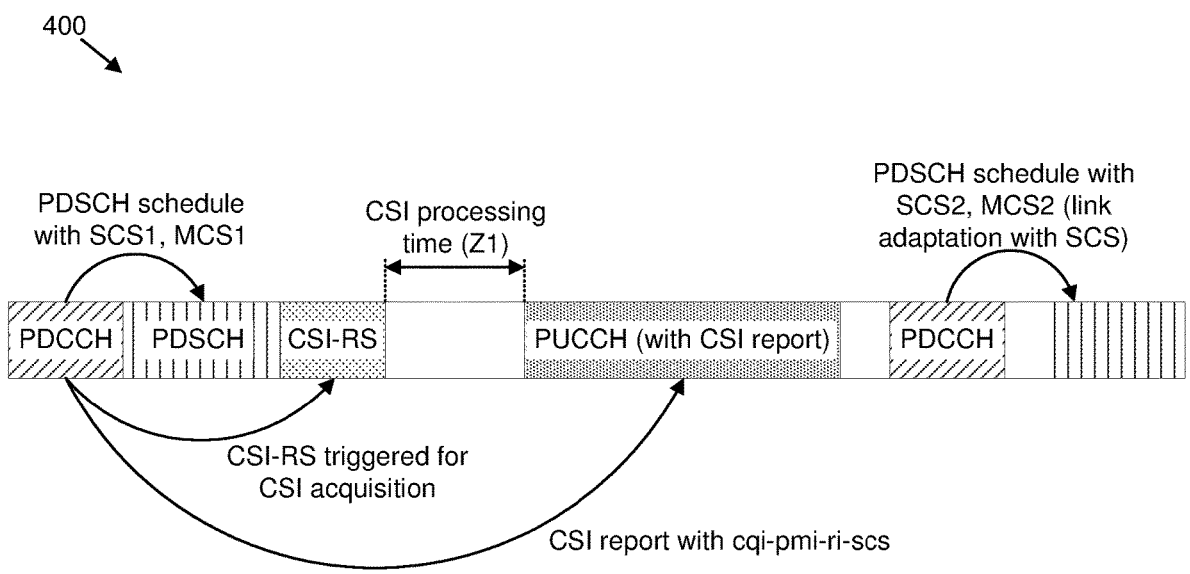
FIG. 4 is a schematic block diagram illustrating one embodiment of link adaptation with an SCS indication.

In certain embodiments, a feedback mechanism from one RX node to a TX node may be used for indicating at least one SCS value (e.g., either explicitly or implicitly) based on channel measurements at the RX node and required performance metrics, use cases, and/or service requirements. The channel measurements may be based on one or more RS received by the RX node. One example is illustrated in FIG. 4 and includes the following: 1) an initial physical downlink shared channel ("PDSCH") transmission is done with SCS1, MCS1 and a channel state information ("CSI") reference signal ("RS") ("CSI-RS") is transmitted for CSI acquisition; 2) the UE performs channel measurements including one or more of: reference signal received power ("RSRP"), reference signal received quality ("RSRQ"), signal to interference and noise ratio ("SINR"), Doppler shift, Doppler spread, average delay, delay spread, measured phase noise power, and/or ICI level and, based on one or more of these measurements, the UE calculates a CSI-RS resource indicator ("CRI") (e.g., beam index), CQI, precoding matrix indicator ("PMI"), and/or rank indicator ("RI") that may be supported for a target transport block BLER and a recommended SCS and may include the recommended SCS in the CSI report. In some embodiments, the UE may recommend a new RS structure like phase tracking reference signal ("PTRS") and/or demodulation reference signal ("DMRS") which may be included with or without (e.g., based on the bandwidth part ("BWP") SCS) the recommended SCS. In one example, the reported CQI, PMI, and/or RI is conditioned on the CRI (e.g., if present) and the recommended SCS; 3) the UE sends back in the CSI report and/or uplink ("UL") control signaling a recommended new SCS and/or new corresponding RS structure to the gNB and the UE may indicate in the report a maximum allowed time that the recommended SCS is valid where the maximum allowed time is derived based on the channel coherence time; 4) the gNB considers the CSI report and/or UL control signaling, check target requirements and updates the MCS to MCS2 and the SCS to SCS2 and/or corresponding RS structures like PTRS and/or DMRS for following data and/or control transmissions; and 5) the gNB indicates the new SCS explicitly and/or implicitly.

FIG. 4 is a schematic block diagram 400 illustrating one embodiment of link adaptation with an SCS indication. As illustrated, a first physical downlink shared channel ("PDSCH") transmission is scheduled with a first SCS (SCS1) and a first MCS (MCS1), then a CSI report is transmitted using a physical uplink control channel ("PUCCH") transmission and includes information to update the SCS, and then based on the CSI report, the second PDSCH transmission is scheduled with a second SCS (SCS2) and a second MCS (MCS2).

As may be appreciated, in some embodiments, UE initiated SCS adaptation based on measured channel conditions at the UE may be enabled, may be beneficial, and the UE may transmit following data and/or control with a more suitable SCS value than would otherwise be possible.

In a first embodiment, an explicit indication of SCS is made in a CSI report. In the first embodiment, CSI reporting may be enhanced to indicate at least one numerology value $\mu$ (e.g., corresponding SCS value of 15 kHz for $\mu$=0, 30 kHz for $\mu$=1, and so forth) by a UE to a network device (e.g., gNB) based on channel measurements and target performance requirements (e.g., target transport block ("TB") BLER). The indicated numerology value $\mu$ may have wideband granularity. Moreover, in the first embodiment, the UE may be configured with CSI-ReportConfig with the higher layer parameter reportQuantity set to either 'cri-RI-PMI-CQI-SCSi', 'cri-RI-i1-SCSi', 'cri-RI-CQI-SCSi', 'cri-RI-LI-PMI-CQI-SCSi', or simple 'SCSi'. If the UE is configured with any of the indicated reportQuantity, then the UE may be expected to indicate at least one numerology value $\mu$ in the CSI report to the network device. If the UE is configured with reportQuantity='SCSi', then the processing timeline for CSI is expected to be shorter in comparison to at least all the other report quantities where SCS is configured to be indicated. It should be noted that SCSi is an example notation for SCS indication in the CSI report and any other notation may be used.

In one implementation of the first embodiment, a number of bits required to report the SCSi is proportional to a number of SCS values enabled (e.g., allowed) for one or more data and/or control channel transmissions. The enabled SCS values may be based on a UE capability or configured by higher layers (e.g., radio resource control ("RRC") or medium access control ("MAC") control element ("CE") ("MAC-CE")) or may depend upon a FR. For example, in FR 1 ("FR1"), 15 kHz and 30 kHz may be mandated to be supported. Therefore, only 1 bit may be indicated where '0' indicates the lower SCS value of 15 kHz and '1' indicates the higher SCS value of 30 kHz. If more than two values are enabled to be indicated, then a greater number of bits may be configured.

In another implementation of the first embodiment, a number of bits required to report the SCSi is proportional to a number of SCS values possible according to configured BWPs for a UE. For example, if a UE is configured with 4 downlink ("DL") BWPs and each BWP is associated with a different SCS value, then up to 2 bits may be needed to indicate the SCSi in the CSI report. In another example, if a UE is configured with 4 DL BWPs, but only two SCS values are associated with them such as BWP1 having 15 kHz, BWP2 having 30 kHz, BWP3 having 15 kHz, and BWP4 having 15 kHz, then only one bit is needed, where '0' would indicate the lowest of the SCS values (e.g., 15 kHz) and '1' would indicate the highest of the SCS values (e.g., 30 kHz).

In a further implementation of the first embodiment, more than one SCSi value (e.g., as a range or multiple of specific values) may be indicated in the CSI report for different BLER, throughput, and/or latency requirements. In one example, two values are indicated, where the first value is expected to be applied for a first transmission on a PDSCH and the second indicated value is expected to be applied for retransmissions and/or repetitions of the initial transmission on the PDSCH. In another example, two or more SCS values are indicated for the first transmission to enable the gNB to choose a suitable SCS for achieving a certain quality of service ("QoS") target and/or to satisfy other UE scheduling requirements.

In one implementation of the first embodiment, the UE indicates multiple SCS values (or numerology values) via an index with a corresponding value in bits, as shown in Table 1. In another implementation of the first embodiment, the UE indicates a best SCS and also indicates steps for next possible SCS values. As an example, the UE may indicate 0100 for SCS 240 kHz and extra bits 0 and 1 to indicate that the next possible SCS is one step down (e.g., 120 kHz) and the last possible SCS is one step up (e.g., 480 kHz) (e.g., one bit differential up and/or down indication with respect to the indicated best (first complete) SCS), or extra bits 0 and 0 to indicate that the next possible SCS is one step down (e.g., 120 kHz) and the last possible SCS is two steps down (e.g., 60 kHz) and so forth (e.g., one bit differential up and/or down indication with respect to the previous or most recent SCS).

TABLE 1

Multiple Values of SCS

| Index | SCS Value(s) |
|---|---|
| 0 | 120 kHz, 240 kHz |
| 1 | 240 kHz, 480 kHz |
| 2 | 480 kHz, 960 kHz |
| 3 | 960 kHz |

In another implementation of the first embodiment, a UE is semi-statically configured with an SCSi table where each index points to one or more values of SCS. If the UE is configured to report SCSi in the CSI report, then the UE indicates one of the indices of the configured table.

In a further implementation of the first embodiment, the SCS indication is tied to a CQI indication, where each value or a group of values in a CQI table are associated with an SCSi value (or numerology value), where preexisting CQI tables may be modified to include the SCSi field, as shown in Table 2. If the UE is configured to report both CQI and SCSi, then the new modified tables for CQI may be used. If the UE is configured to report only CQI, then tables with only MCS values may be used. If only SCSi is configured to be reported, then a specific SCSi field may be used according to other implementations. In one example, for a given SCSi value, only a subset of CQI values (e.g., from MCS tables) may be reported.

TABLE 2

SCSi Along with CQI

| CQI index | modulation | code rate × 1024 | efficiency | SCSi |
|---|---|---|---|---|
| 0 | | out of range | | |
| 1 | QPSK | 78 | 0.1523 | 120 kHz |
| 2 | QPSK | 120 | 0.2344 | 120 kHz |
| 3 | QPSK | 193 | 0.3770 | 120 kHz |
| 4 | QPSK | 308 | 0.6016 | 120 kHz |
| 5 | QPSK | 449 | 0.8770 | 240 kHz |
| 6 | QPSK | 602 | 1.1758 | 240 kHz |
| 7 | 16QAM | 378 | 1.4766 | 120 kHz |
| 8 | 16QAM | 490 | 1.9141 | 240 kHz |
| 9 | 16QAM | 616 | 2.4063 | 480 kHz |
| 10 | 64QAM | 466 | 2.7305 | 480 kHz |
| 11 | 64QAM | 567 | 3.3223 | 480 kHz |
| 12 | 64QAM | 666 | 3.9023 | 960 kHz |
| 13 | 64QAM | 772 | 4.5234 | 960 kHz |
| 14 | 64QAM | 873 | 5.1152 | 960 kHz |
| 15 | 64QAM | 948 | 5.5547 | 960 kHz |

In certain implementations of the first embodiment, a CSI reporting setting or CSI report configuration includes a first CSI resource configuration (e.g., non-zero power ("NZP") CSI-RS) for channel measurement and a first CSI resource configuration interference measurement ("IM") (e.g., CSI IM ("CSI-IM") and/or NZP CSI-RS IM report ("IMR")) based on a first SCS (e.g., the SCS of a current active BWP). The UE determines the preferred or recommend SCSi (e.g., which may be different than the first SCS) based on the first CSI resource configurations (e.g., receiving the CSI-RS associated with at least one of the first CSI resource configurations) associated with the first SCS. In one example, the reported CQI, PMI, and/or RI is conditioned on the CRI (e.g., if present) and the recommended SCSi. The CSI report may include at least one of the CQI, PMI, RI, and/or CRI and the recommended SCSi is transmitted on an UL channel in the BWP associated with the first SCS. The CSI processing time may be based on the first SCS and a number of hypothesis of different values for SCSi.

In some implementations of the first embodiment, a CSI reporting setting or CSI report configuration includes a first CSI resource configuration (e.g., NZP CSI-RS) for channel measurement and a first CSI resource configuration interference measurement (e.g., CSI-IM and/or NZP CSI-RS IMR) based on a first SCS (e.g., the SCS of a current active BWP), and a second CSI resource configuration (e.g., NZP CSI-RS) for channel measurement and a second CSI resource configuration interference measurement (e.g., CSI-IM and/or NZP CSI-RS IMR) based on a second SCS (e.g., the second SCS is different than the first SCS). In one example, the second CSI resource configurations may be configured in the same BWP as the first SCS or may be configured in another BWP different than the BWP associated with the first SCS. The CSI-RS may be an aperiodic CSI-RS triggered by a PDCCH (e.g., in the BWP associated with the first SCS). The UE may determine the recommended SCSi among the first SCS and the second SCS based on the received CSI-RS associated with the first CSI resource configurations and the second CSI resource configurations. In one example, the reported CQI, PMI, and/or RI is conditioned on the CRI (e.g., if present) and the recommended SCSi and based on the CSI resource configuration corresponding to the recommended SCSi. In another example, for a beam or a quasi-co-location ("QCL") TypeD ("QCL-TypeD") property reference RS, the UE assumes the second CSI resource configuration is the same as the beam or the QCL-TypeD property reference RS for the corresponding first CSI resource configuration. The CSI report may include at least one of the CQI, PMI, RI, and/or CRI and the recommended SCSi is transmitted on an UL channel in the BWP associated with the first SCS. The CSI processing time may be based on the first SCS and the second SCS. For aperiodic CSI-RS, the CSI-RS associated with the second CSI-RS resource configuration is received only after the end on the PDCCH triggering the aperiodic CSI report. In one example, with a first SCS<a second SCS, a minimum triggering delay is quantized to the start of the next slot in numerology of the second SCS.

In various implementations of the first embodiment, the UE may report the recommended SCS using UL control signaling such as uplink assistance information or MAC CE.

In certain implementations of the first embodiment, the UE may indicate in the report a maximum allowed time period in terms of symbols and/or slots until which the recommended SCS is valid, where the maximum allowed time is derived based on a channel coherence time, which may be calculated using a receiver algorithm such as Doppler spread, and so forth.

In a second embodiment, there may be an implicit indication of SCS in a CSI report. In the second embodiment, CSI reporting is enhanced to indicate at least one configured BWP index (e.g., each associated with SCS values) (e.g., by a UE to a network device (e.g., gNB)) based on channel measurements and target performance requirements. According to the second embodiment, the UE may be configured with a CSI-ReportConfig with a higher layer parameter reportQuantity set to either 'cri-RI-PMI-CQI-BWPi', 'cri-RI-i1-BWPi', 'cri-RI-CQI-BWPi', 'cri-RI-LI-PMI-CQI-BWPi', or simple 'BWPi'. If the UE is configured with the reportQuantity, then the UE is expected to indicate at least one of configured BWP index value μ in the CSI report provided to the network device. If the UE is configured with reportQuantity='BWPi', then the processing timeline for CSI is expected to be shorter than at least all the other report quantities where SCS is configured to be indicated. It should be noted that BWPi is an example notation for a BWP indication in the CSI report (any other notation may be used).

In one implementation of the second embodiment, a number of bits required to report the BWPi is proportional to a number of BWPs configured for DL channels and/or signals.

In another implementation of the second embodiment, more than one BWP index value (e.g., as a range or multiple specific values) may be indicated in the CSI report.

In certain implementations of the second embodiment, the BWP index value is tied to a CQI indication. Each value or group of values in a CQI table is associated with a BWP index value. CQI tables may be modified to include a BWP index field, as shown in Table 3. If the UE is configured to report both CQI and BWPi, then the modified tables that include the BWP index field may be used. If the UE is configured to report only CQI, then CQI tables (e.g., with only MCS values) may be used. If only BWPi is configured to be reported, then a specific SCSi field may be used. In one example, for a given BWPi value, only a subset of CQI values (e.g., from MCS tables) may be reported.

In some implementations of the second embodiment, a CSI reporting setting or CSI report configuration includes a first CSI resource configuration (e.g., NZP CSI-RS) for channel measurement and a first CSI resource configuration interference measurement (e.g., CSI-IM and/or NZP CSI-RS IMR) on a first BWP (e.g., current active BWP) associated with a first SCS. The UE determines the preferred or recommend BWPi (e.g., which may be different than the first BWP and with a second SCS different than the first SCS) based on the first CSI resource configuration (e.g., receiving the CSI-RS associated with the first CSI resource configuration) on the first BWP. In one example, a reported CQI, PMI, and/or RI is conditioned on a CRI (e.g., if present) and the recommended BWPi (e.g., and associated SCS). The CSI report includes at least one of CQI, PMI, RI, and/or CRI and a recommended BWPi is transmitted on an UL channel in the first BWP. The CSI processing time may be based on the first SCS of the first BWP and a number of hypothesis of different values for BWPi.

In various implementations of the second embodiment, a CSI reporting setting or CSI report configuration includes a first CSI resource configuration (e.g., NZP CSI-RS) for channel measurement and a first CSI resource configuration interference measurement (e.g., CSI-IM and/or NZP CSI-RS IMR) on a first BWP with a first SCS (e.g., current active BWP), and a second CSI resource configuration (e.g., NZP CSI-RS) for channel measurement and a second CSI resource configuration interference measurement (e.g., CSI-IM and/or NZP CSI-RS IMR) on a second BWP with a second SCS (e.g., the second SCS is different than the first SCS). The CSI-RS may be an aperiodic CSI-RS triggered by a PDCCH (e.g., in the first BWP associated with the first SCS). The UE determines the recommended BWPi among the first BWP and the second BWP based on the received CSI-RS associated with the first CSI resource configurations and the second CSI resource configurations. In one example, a reported CQI, PMI, and/or RI may be conditioned on a CRI (e.g., if present) and the SCS associated with the recommended BWPi and based on the CSI resource configuration corresponding to the recommended BWPi. In another example, for a beam or a QCL-TypeD property reference RS, the UE assumes the second CSI resource configuration is the same as the beam or the QCL-TypeD property reference RS for the corresponding first CSI resource configuration. The CSI report includes at least one of a CQI, PMI, RI, and/or CRI and a recommended BWPi is transmitted on an UL channel in the first BWP. The CSI processing time may be based on the first SCS of the first BWP and the second SCS of the second BWP. For aperiodic CSI-RS, the CSI-RS associated with the second CSI-RS resource configuration on the second BWP is received only after an end on the PDCCH triggering the aperiodic CSI report on the first BWP. In one example, if a first SCS<a second SCS, a minimum triggering delay is quantized to a start of the next slot in numerology of the second SCS associated with the second BWP.

TABLE 3

BWPi Along with CQI

| CQI index | modulation | code rate × 1024 | efficiency | BWPi |
|---|---|---|---|---|
| 0 | | out of range | | |
| 1 | QPSK | 78 | 0.1523 | 0 |
| 2 | QPSK | 120 | 0.2344 | 3 |
| 3 | QPSK | 193 | 0.3770 | 0 |
| 4 | QPSK | 308 | 0.6016 | 0 |
| 5 | QPSK | 449 | 0.8770 | 1 |
| 6 | QPSK | 602 | 1.1758 | 1 |
| 7 | 16QAM | 378 | 1.4766 | 1 |
| 8 | 16QAM | 490 | 1.9141 | 1 |
| 9 | 16QAM | 616 | 2.4063 | 2 |
| 10 | 64QAM | 466 | 2.7305 | 2 |

TABLE 3-continued

BWPi Along with CQI

| CQI index | modulation | code rate × 1024 | efficiency | BWPi |
|---|---|---|---|---|
| 11 | 64QAM | 567 | 3.3223 | 3 |
| 12 | 64QAM | 666 | 3.9023 | 1 |
| 13 | 64QAM | 772 | 4.5234 | 2 |
| 14 | 64QAM | 873 | 5.1152 | 2 |
| 15 | 64QAM | 948 | 5.5547 | 3 |

In a third embodiment, there may be an indication of SCS by a network device (e.g., gNB) transmitted to a UE for receiving DL transmissions. In the third embodiment, a gNB indicates an SCS value for transmissions to the UE in an explicit or implicit manner to indicate for the UE to switch to a different SCS value. In one implementation of the third embodiment, multiple SCS values may be associated with a single BWP index and the gNB indicates both the BWP index value and an SCS index value in DCI. If the indicated BWP index is the same as for previous transmissions, only a new SCS index value is indicated, then a SCS switching delay is expected to be smaller to a BWP switching delay, depending upon UE capability. In other words, different switching delay values may be configured by transmission from the gNB to the UE (e.g., according to capability). In one example, if the UE is configured with a single BWP index for DL, but multiple SCS indices, then an existing bit field used for BWP indication may be interpreted differently for indicating the SCS value within the same BWP.

In another implementation of the third embodiment, if multiple SCS and/or BWP values are reported back by the UE in the CSI report, then the gNB may signal an index that indicates multiple values for receiving DL transmissions and further retransmissions and/or repetitions.

In a further implementation of the third embodiment, if a gNB has configured a UE with new, enhanced, and/or modified CQI and MCS tables with an additional field to indicate SCS and/or BWP values, then an MCS field in DCI may signal an index to a table for indicating both the MCS value and the SCS value to be used for receiving DL transmissions.

In a fourth embodiment, an indication of SCS may be made in a CSI report in SL. In the fourth embodiment, CSI reporting for SL may be enhanced to indicate additional fields with SCS values to be used for receiving SL transmissions. For reporting from a receiver ("RX") UE to a transmit ("TX") UE, and according to the fourth embodiment, the RX UE may report a recommended SCS value to be used. In one example, a MAC CE is defined for reporting recommended SCS. In another example, one or two bits are defined as part of an existing CSI report MAC CE structure of CQI, and RI to indicate a recommended SCS depending on a frequency range. In a further example, a recommended SCS is implicitly indicated along with a CQI value in any embodiment described herein.

For a MAC CE, a gNB may configure and/or preconfigure a fixed priority value and a latency bound for transmission of the MAC CE. A number of bits may be configured and/or preconfigured by the gNB or there may be a fixed value specified in the specification based on a FR. One or more parameters such as priority value, latency bound, periodicity, sidelink BWP switching delay, supported SCS, and/or configured sidelink BWP may be exchanged using UE to UE ("PC5") RRC signaling.

For mode 2-autonomous resource selection, the TX UE may indicate sidelink BWP switching in 2nd sidelink control information ("SCI"). A 2nd SCI format may be defined and may indicate a new BWP identifier ("ID") and may be implemented for sidelink similar to the third embodiment.

The TX UE may perform a new resource selection and/or reselection trigger based on a received report from the RX UE. A resource selection and/or reselection trigger may contain one or more parameters for the new BWP ID containing a new SCS and a corresponding resource pool ID for performing candidate resource selection and exclusion.

In certain embodiments, for reporting from a TX UE to a gNB for Mode 1 (e.g., gNB controlled sidelink), the TX UE may report a recommended SCS and/or CP type to the gNB considering supported SCS or configured sidelink BWP from the RX UE. In one implementation, CSI reporting for sidelink in PUCCH or PUSCH may be used. In another implementation, a new MAC CE may be used for the report and may be made in a UE to network ("Uu") interface. In such embodiments, the gNB may indicate sidelink BWP switching for sidelink in DCI (e.g., DCI format 30, or a new DCI format). A new sidelink BWP ID may be specified and an offset in a DCI format 3_0 field may include a sidelink BWP switching latency.

For a shared spectrum between Uu and SL (mode 1), if there is a shared spectrum between Uu and sidelink, the UE may report a recommended SCS independently for both Uu and SL to the gNB. In one implementation, if the recommended SCS is different for Uu and SL, then the gNB may compare a data priority of corresponding UL or SL traffic with their corresponding scheduling request ("SR") and/or buffer status report ("BSR") and may select one of the SCS from the recommended SCS from UL and SL. The selected SCS may be applied for both Uu and SL so that the UE does not need to have switching latency between Uu and SL. In another implementation, the gNB may compare a data priority of corresponding UL or SL traffic, and may perform BWP and/or SCS switching. In another implementation, the UE may report a combined reporting of recommended SCS considering both Uu and SL.

For a shared spectrum between Uu and SL (mode 2-autonomous resource selection), if there is a shared spectrum between Uu and sidelink, the UE may estimate a recommended SCS for Uu link from channel measurements and may receive a recommended SCS from an RX UE for sidelink. In one implementation, if the SCS is different for Uu and SL, then the TX UE may prioritize UL or SL based on a priority of the traffic from their corresponding UL or SL TB. The TX UE may signal the recommended SCS to the gNB if the UL is prioritized compared to SL. In another implementation, the TX UE may perform autonomous BWP switching to a recommended SCS received from the RX UE if the SL is prioritized compared to UL.

In a fifth embodiment, a cyclic prefix length may be indicated and/or updated based on an SCS adaptation. According to the fifth embodiment, CSI reporting may be enhanced to indicate whether a normal cyclic prefix or extended cyclic prefix is used with SCS and/or BWP adaptation. Further extended CP may be considered with much higher overhead for very high SCS or depending upon channel measurements.

In one implementation of the fifth embodiment, an additional bit in a CSI report may be used for indicating which CP type may be used for further transmissions. In another implementation of the fifth embodiment, a CP type could be indicated as part of a SCSi, BWPi, and/or CQI table with an additional column indicating the CP type.

In certain implementations of the fifth embodiment, instead of explicitly indicating a CP type, the CP type may be implicitly assumed to be indicated by a UE for a specific indicated SCS value. In such implementations, the UE may be configured with a table that maps different SCS values to CP types and, based on that table, the CP type is adapted as SCS is adapted.

In various implementations of the fifth embodiment, a UE may indicate in a report a maximum allowed time period in terms of symbols and/or slots until a recommended CP type is valid where the maximum allowed time is derived based on a channel coherence bandwidth that may be calculated using a receiver algorithm such as delay spread.

Figure 5:
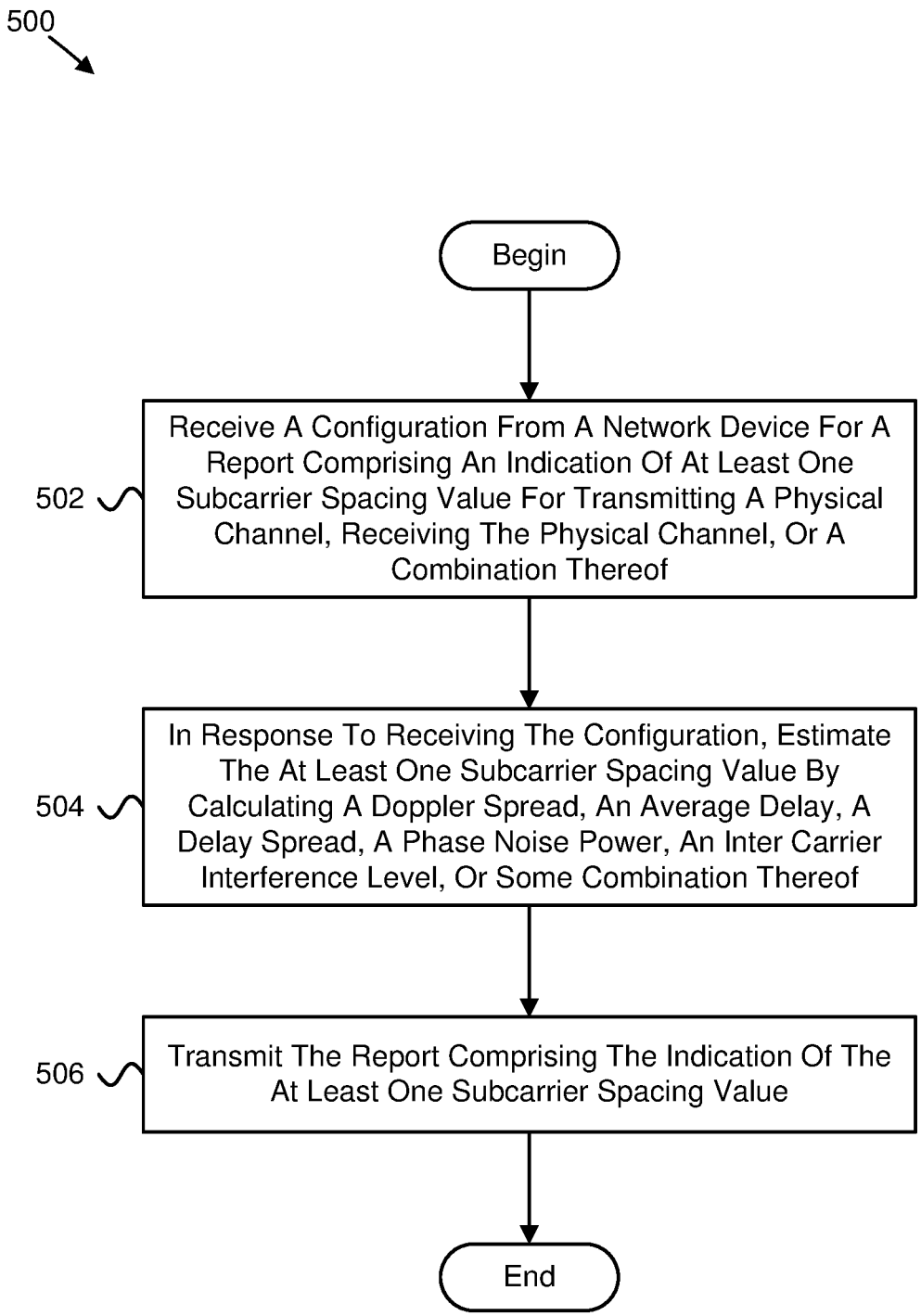
FIG. 5 is a flow chart diagram illustrating one embodiment of a method for indicating a subcarrier spacing value.

FIG. 5 is a flow chart diagram illustrating one embodiment of a method 500 for indicating a subcarrier spacing value. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

In various embodiments, the method 500 includes receiving 502 a configuration from a network device for a report including an indication of at least one subcarrier spacing value for transmitting a physical channel, receiving the physical channel, or a combination thereof. In some embodiments, the method 500 includes, in response to receiving the configuration, estimating 504 the at least one subcarrier spacing value by calculating a Doppler spread, an average delay, a delay spread, a phase noise power, an inter carrier interference level, or some combination thereof. In certain embodiments, the method 500 includes transmitting 506 the report including the indication of the at least one subcarrier spacing value.

In certain embodiments, the method 500 further comprises transmitting information indicating a capability to support a set of subcarrier spacing values corresponding to a frequency band, wherein the at least one subcarrier spacing value indicated in the report is part of the set of subcarrier spacing values. In some embodiments, a size of the indication in the report is determined based on a number of subcarriers spacing values in the set of subcarrier spacing values indicated as capability information. In various embodiments, a size of the indication in the report is determined based on a number of bandwidth parts configured for the device and subcarrier spacing values associated with the bandwidth parts for transmission, reception, or a combination thereof.

In one embodiment, one bandwidth part is associated with one subcarrier spacing value and the device implicitly reports the subcarrier spacing value by reporting an index of a bandwidth part. In certain embodiments, the method 500 further comprises receiving a subcarrier spacing table that contains at least two columns comprising an index value and at least one corresponding subcarrier spacing value. In some embodiments, the report comprises at least one index value from the subcarrier spacing table.

In various embodiments, subcarrier spacing values in the table are a subset of all supported subcarrier spacing values. In one embodiment, the subset is based on a carrier frequency used for transmissions. In certain embodiments, the subset is based on configured bandwidth parts for corresponding transmissions.

In some embodiments, the method 500 further comprises receiving a channel quality indicator table that comprises a plurality of columns indicating a subcarrier spacing, a numerology, a bandwidth party index value, a modulation order, a code rate, a spectral efficiency, or some combination thereof. In various embodiments, the report comprises a cyclic prefix type for the subcarrier spacing value, a cyclic prefix length for the subcarrier spacing value, a bandwidth part for the subcarrier spacing value, a cyclic prefix type for the bandwidth part, a cyclic prefix length for the bandwidth part, or some combination thereof. In one embodiment, the configuration comprises a first channel state information resource configuration for channel measurement and a first channel state information resource configuration interference measurement on a first bandwidth part associated with a first subcarrier spacing.

In certain embodiments, the method 500 further comprises determining a bandwidth part index based on the first channel state information resource configurations associated with the first subcarrier spacing. In some embodiments, the configuration comprises a first channel state information resource configuration for channel measurement and a first channel state information resource configuration interference measurement based on a first subcarrier spacing, and a second channel state information resource configuration for channel measurement and a second channel state information resource configuration interference measurement based on a second subcarrier spacing different from the first subcarrier spacing. In various embodiments, the report comprises information indicating at least one subcarrier spacing value, at least one bandwidth part, or a combination thereof to be used for receiving subsequent sidelink transmissions.

Figure 6:
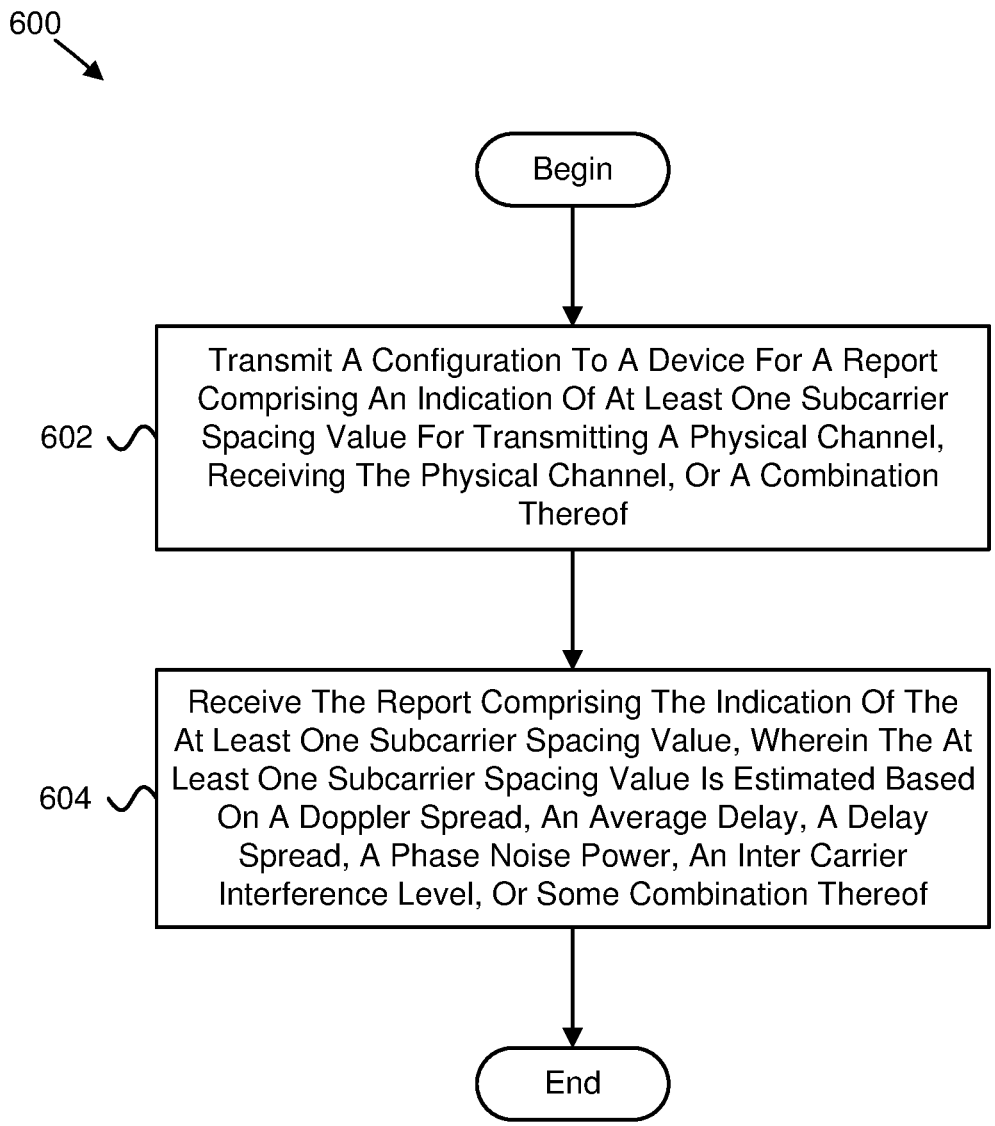
FIG. 6 is a flow chart diagram illustrating another embodiment of a method for indicating a subcarrier spacing value.

FIG. 6 is a flow chart diagram illustrating another embodiment of a method 600 for indicating a subcarrier spacing value. In some embodiments, the method 600 is performed by an apparatus, such as the network unit 104. In certain embodiments, the method 600 may be performed by a processor executing program code, for example, a microcontroller, a microprocessor, a CPU, a GPU, an auxiliary processing unit, a FPGA, or the like.

In various embodiments, the method 600 includes transmitting 602 a configuration to a device for a report including an indication of at least one subcarrier spacing value for transmitting a physical channel, receiving the physical channel, or a combination thereof. In some embodiments, the method 600 includes receiving 604 the report including the indication of the at least one subcarrier spacing value. The at least one subcarrier spacing value is estimated based on a Doppler spread, an average delay, a delay spread, a phase noise power, an inter carrier interference level, or some combination thereof.

In certain embodiments, the method 600 further comprises receiving information indicating a capability to support a set of subcarrier spacing values corresponding to a frequency band, wherein the at least one subcarrier spacing value indicated in the report is part of the set of subcarrier spacing values. In some embodiments, a size of the indication in the report is determined based on a number of subcarriers spacing values in the set of subcarrier spacing values indicated as capability information. In various embodiments, a size of the indication in the report is determined based on a number of bandwidth parts configured for the device and subcarrier spacing values associated with the bandwidth parts for transmission, reception, or a combination thereof.

In one embodiment, one bandwidth part is associated with one subcarrier spacing value and the device implicitly reports the subcarrier spacing value by reporting an index of a bandwidth part. In certain embodiments, the method 600 further comprises transmitting a subcarrier spacing table that contains at least two columns comprising an index value and at least one corresponding subcarrier spacing value. In some embodiments, the report comprises at least one index value from the subcarrier spacing table.

In various embodiments, subcarrier spacing values in the table are a subset of all supported subcarrier spacing values. In one embodiment, the subset is based on a carrier frequency used for transmissions. In certain embodiments, the subset is based on configured bandwidth parts for corresponding transmissions.

In some embodiments, the method 600 further comprises transmitting a channel quality indicator table that comprises a plurality of columns indicating a subcarrier spacing, a numerology, a bandwidth party index value, a modulation order, a code rate, a spectral efficiency, or some combination thereof. In various embodiments, the report comprises a cyclic prefix type for the subcarrier spacing value, a cyclic prefix length for the subcarrier spacing value, a bandwidth part for the subcarrier spacing value, a cyclic prefix type for the bandwidth part, a cyclic prefix length for the bandwidth part, or some combination thereof.

In one embodiment, the configuration comprises a first channel state information resource configuration for channel measurement and a first channel state information resource configuration interference measurement on a first bandwidth part associated with a first subcarrier spacing. In certain embodiments, the configuration comprises a first channel state information resource configuration for channel measurement and a first channel state information resource configuration interference measurement based on a first subcarrier spacing, and a second channel state information resource configuration for channel measurement and a second channel state information resource configuration interference measurement based on a second subcarrier spacing different from the first subcarrier spacing. In some embodiments, the report comprises information indicating at least one subcarrier spacing value, at least one bandwidth part, or a combination thereof to be used for transmitting subsequent sidelink transmissions.

In one embodiment, a method at a device comprises: receiving a configuration from a network device for a report comprising an indication of at least one subcarrier spacing value for transmitting a physical channel, receiving the physical channel, or a combination thereof; in response to receiving the configuration, estimating the at least one subcarrier spacing value by calculating a Doppler spread, an average delay, a delay spread, a phase noise power, an inter carrier interference level, or some combination thereof; and transmitting the report comprising the indication of the at least one subcarrier spacing value.

In certain embodiments, the method further comprises transmitting information indicating a capability to support a set of subcarrier spacing values corresponding to a frequency band, wherein the at least one subcarrier spacing value indicated in the report is part of the set of subcarrier spacing values.

In some embodiments, a size of the indication in the report is determined based on a number of subcarriers spacing values in the set of subcarrier spacing values indicated as capability information.

In various embodiments, a size of the indication in the report is determined based on a number of bandwidth parts configured for the device and subcarrier spacing values associated with the bandwidth parts for transmission, reception, or a combination thereof.

In one embodiment, one bandwidth part is associated with one subcarrier spacing value and the device implicitly reports the subcarrier spacing value by reporting an index of a bandwidth part.

In certain embodiments, the method further comprises receiving a subcarrier spacing table that contains at least two columns comprising an index value and at least one corresponding subcarrier spacing value.

In some embodiments, the report comprises at least one index value from the subcarrier spacing table.

In various embodiments, subcarrier spacing values in the table are a subset of all supported subcarrier spacing values.

In one embodiment, the subset is based on a carrier frequency used for transmissions.

In certain embodiments, the subset is based on configured bandwidth parts for corresponding transmissions.

In some embodiments, the method further comprises receiving a channel quality indicator table that comprises a plurality of columns indicating a subcarrier spacing, a numerology, a bandwidth party index value, a modulation order, a code rate, a spectral efficiency, or some combination thereof.

In various embodiments, the report comprises a cyclic prefix type for the subcarrier spacing value, a cyclic prefix length for the subcarrier spacing value, a bandwidth part for the subcarrier spacing value, a cyclic prefix type for the bandwidth part, a cyclic prefix length for the bandwidth part, or some combination thereof.

In one embodiment, the configuration comprises a first channel state information resource configuration for channel measurement and a first channel state information resource configuration interference measurement on a first bandwidth part associated with a first subcarrier spacing.

In certain embodiments, the method further comprises determining a bandwidth part index based on the first channel state information resource configurations associated with the first subcarrier spacing.

In some embodiments, the configuration comprises a first channel state information resource configuration for channel measurement and a first channel state information resource configuration interference measurement based on a first subcarrier spacing, and a second channel state information resource configuration for channel measurement and a second channel state information resource configuration interference measurement based on a second subcarrier spacing different from the first subcarrier spacing.

In various embodiments, the report comprises information indicating at least one subcarrier spacing value, at least one bandwidth part, or a combination thereof to be used for receiving subsequent sidelink transmissions.

In one embodiment, an apparatus comprises a device. The apparatus further comprises: a receiver that receives a configuration from a network device for a report comprising an indication of at least one subcarrier spacing value for transmitting a physical channel, receiving the physical channel, or a combination thereof; a processor that, in response to receiving the configuration, estimates the at least one subcarrier spacing value by calculating a Doppler spread, an average delay, a delay spread, a phase noise power, an inter carrier interference level, or some combination thereof, and a transmitter that transmits the report comprising the indication of the at least one subcarrier spacing value.

In certain embodiments, the transmitter transmits information indicating a capability to support a set of subcarrier spacing values corresponding to a frequency band, and the at least one subcarrier spacing value indicated in the report is part of the set of subcarrier spacing values.

In some embodiments, a size of the indication in the report is determined based on a number of subcarriers spacing values in the set of subcarrier spacing values indicated as capability information.

In various embodiments, a size of the indication in the report is determined based on a number of bandwidth parts configured for the device and subcarrier spacing values associated with the bandwidth parts for transmission, reception, or a combination thereof.

In one embodiment, one bandwidth part is associated with one subcarrier spacing value and the device implicitly reports the subcarrier spacing value by reporting an index of a bandwidth part.

In certain embodiments, the receiver receives a subcarrier spacing table that contains at least two columns comprising an index value and at least one corresponding subcarrier spacing value.

In some embodiments, the report comprises at least one index value from the subcarrier spacing table.

In various embodiments, subcarrier spacing values in the table are a subset of all supported subcarrier spacing values.

In one embodiment, the subset is based on a carrier frequency used for transmissions.

In certain embodiments, the subset is based on configured bandwidth parts for corresponding transmissions.

In some embodiments, the receiver receives a channel quality indicator table that comprises a plurality of columns indicating a subcarrier spacing, a numerology, a bandwidth party index value, a modulation order, a code rate, a spectral efficiency, or some combination thereof.

In various embodiments, the report comprises a cyclic prefix type for the subcarrier spacing value, a cyclic prefix length for the subcarrier spacing value, a bandwidth part for the subcarrier spacing value, a cyclic prefix type for the bandwidth part, a cyclic prefix length for the bandwidth part, or some combination thereof.

In one embodiment, the configuration comprises a first channel state information resource configuration for channel measurement and a first channel state information resource configuration interference measurement on a first bandwidth part associated with a first subcarrier spacing.

In certain embodiments, the processor determines a bandwidth part index based on the first channel state information resource configurations associated with the first subcarrier spacing.

In some embodiments, the configuration comprises a first channel state information resource configuration for channel measurement and a first channel state information resource configuration interference measurement based on a first subcarrier spacing, and a second channel state information resource configuration for channel measurement and a second channel state information resource configuration interference measurement based on a second subcarrier spacing different from the first subcarrier spacing.

In various embodiments, the report comprises information indicating at least one subcarrier spacing value, at least one bandwidth part, or a combination thereof to be used for receiving subsequent sidelink transmissions.

In one embodiment, a method at a network device comprises: transmitting a configuration to a device for a report comprising an indication of at least one subcarrier spacing value for transmitting a physical channel, receiving the physical channel, or a combination thereof; and receiving the report comprising the indication of the at least one subcarrier spacing value, wherein the at least one subcarrier spacing value is estimated based on a Doppler spread, an average delay, a delay spread, a phase noise power, an inter carrier interference level, or some combination thereof.

In certain embodiments, the method further comprises receiving information indicating a capability to support a set of subcarrier spacing values corresponding to a frequency band, wherein the at least one subcarrier spacing value indicated in the report is part of the set of subcarrier spacing values.

In some embodiments, a size of the indication in the report is determined based on a number of subcarriers spacing values in the set of subcarrier spacing values indicated as capability information.

In various embodiments, a size of the indication in the report is determined based on a number of bandwidth parts configured for the device and subcarrier spacing values associated with the bandwidth parts for transmission, reception, or a combination thereof.

In one embodiment, one bandwidth part is associated with one subcarrier spacing value and the device implicitly reports the subcarrier spacing value by reporting an index of a bandwidth part.

In certain embodiments, the method further comprises transmitting a subcarrier spacing table that contains at least two columns comprising an index value and at least one corresponding subcarrier spacing value.

In some embodiments, the report comprises at least one index value from the subcarrier spacing table.

In various embodiments, subcarrier spacing values in the table are a subset of all supported subcarrier spacing values.

In one embodiment, the subset is based on a carrier frequency used for transmissions.

In certain embodiments, the subset is based on configured bandwidth parts for corresponding transmissions.

In some embodiments, the method further comprises transmitting a channel quality indicator table that comprises a plurality of columns indicating a subcarrier spacing, a numerology, a bandwidth party index value, a modulation order, a code rate, a spectral efficiency, or some combination thereof.

In various embodiments, the report comprises a cyclic prefix type for the subcarrier spacing value, a cyclic prefix length for the subcarrier spacing value, a bandwidth part for the subcarrier spacing value, a cyclic prefix type for the bandwidth part, a cyclic prefix length for the bandwidth part, or some combination thereof.

In one embodiment, the configuration comprises a first channel state information resource configuration for channel measurement and a first channel state information resource configuration interference measurement on a first bandwidth part associated with a first subcarrier spacing.

In certain embodiments, the configuration comprises a first channel state information resource configuration for channel measurement and a first channel state information resource configuration interference measurement based on a first subcarrier spacing, and a second channel state information resource configuration for channel measurement and a second channel state information resource configuration interference measurement based on a second subcarrier spacing different from the first subcarrier spacing.

In some embodiments, the report comprises information indicating at least one subcarrier spacing value, at least one bandwidth part, or a combination thereof to be used for transmitting subsequent sidelink transmissions.

In one embodiment, an apparatus comprises a network device. The apparatus further comprises: a transmitter that transmits a configuration to a device for a report comprising an indication of at least one subcarrier spacing value for transmitting a physical channel, receiving the physical channel, or a combination thereof, and a receiver that receives the report comprising the indication of the at least one subcarrier spacing value, wherein the at least one subcarrier spacing value is estimated based on a Doppler spread, an average delay, a delay spread, a phase noise power, an inter carrier interference level, or some combination thereof.

In certain embodiments, the receiver receives information indicating a capability to support a set of subcarrier spacing values corresponding to a frequency band, wherein the at least one subcarrier spacing value indicated in the report is part of the set of subcarrier spacing values.

In some embodiments, a size of the indication in the report is determined based on a number of subcarriers spacing values in the set of subcarrier spacing values indicated as capability information.

In various embodiments, a size of the indication in the report is determined based on a number of bandwidth parts configured for the device and subcarrier spacing values associated with the bandwidth parts for transmission, reception, or a combination thereof.

In one embodiment, one bandwidth part is associated with one subcarrier spacing value and the device implicitly reports the subcarrier spacing value by reporting an index of a bandwidth part.

In certain embodiments, the transmitter transmits a subcarrier spacing table that contains at least two columns comprising an index value and at least one corresponding subcarrier spacing value.

In some embodiments, the report comprises at least one index value from the subcarrier spacing table.

In various embodiments, subcarrier spacing values in the table are a subset of all supported subcarrier spacing values.

In one embodiment, the subset is based on a carrier frequency used for transmissions.

In certain embodiments, the subset is based on configured bandwidth parts for corresponding transmissions.

In some embodiments, the transmitter transmits a channel quality indicator table that comprises a plurality of columns indicating a subcarrier spacing, a numerology, a bandwidth party index value, a modulation order, a code rate, a spectral efficiency, or some combination thereof.

In various embodiments, the report comprises a cyclic prefix type for the subcarrier spacing value, a cyclic prefix length for the subcarrier spacing value, a bandwidth part for the subcarrier spacing value, a cyclic prefix type for the bandwidth part, a cyclic prefix length for the bandwidth part, or some combination thereof.

In one embodiment, the configuration comprises a first channel state information resource configuration for channel measurement and a first channel state information resource configuration interference measurement on a first bandwidth part associated with a first subcarrier spacing.

In certain embodiments, the configuration comprises a first channel state information resource configuration for channel measurement and a first channel state information resource configuration interference measurement based on a first subcarrier spacing, and a second channel state information resource configuration for channel measurement and a second channel state information resource configuration interference measurement based on a second subcarrier spacing different from the first subcarrier spacing.

In some embodiments, the report comprises information indicating at least one subcarrier spacing value, at least one bandwidth part, or a combination thereof to be used for transmitting subsequent sidelink transmissions.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at a device, the method comprising:
receiving a configuration from a network device for a report comprising an indication of at least one subcarrier spacing value for transmitting a physical channel, receiving the physical channel, or a combination thereof;
in response to receiving the configuration, estimating the at least one subcarrier spacing value by calculating a Doppler spread, an average delay, a delay spread, a phase noise power, an inter carrier interference level, or some combination thereof; and
transmitting the report comprising the indication of the at least one subcarrier spacing value.

2. The method of claim 1, further comprising transmitting information indicating a capability to support a set of subcarrier spacing values corresponding to a frequency band, wherein the at least one subcarrier spacing value indicated in the report is part of the set of subcarrier spacing values.

3. The method of claim 2, wherein a size of the indication in the report is determined based on a number of subcarriers spacing values in the set of subcarrier spacing values indicated as capability information.

4. The method of claim 1, wherein a size of the indication in the report is determined based on a number of bandwidth parts configured for the device and subcarrier spacing values associated with the bandwidth parts for transmission, reception, or a combination thereof.

5. The method of claim 1, wherein one bandwidth part is associated with one subcarrier spacing value and the device implicitly reports the subcarrier spacing value by reporting an index of a bandwidth part.

6. The method of claim 1, further comprising receiving a subcarrier spacing table that contains at least two columns comprising an index value and at least one corresponding subcarrier spacing value.

7. The method of claim 6, wherein the report comprises at least one index value from the subcarrier spacing table.

8. The method of claim 6, wherein a subset is based on a carrier frequency used for transmissions.

9. The method of claim 1, further comprising receiving a channel quality indicator table that comprises a plurality of columns indicating a subcarrier spacing, a numerology, a bandwidth party index value, a modulation order, a code rate, a spectral efficiency, or some combination thereof.

10. The method of claim 1, wherein the configuration comprises a first channel state information resource configuration for channel measurement and a first channel state information resource configuration interference measurement on a first bandwidth part associated with a first subcarrier spacing.

11. The method of claim 10, further comprising determining a bandwidth part index based on the first channel state information resource configurations associated with the first subcarrier spacing.

12. The method of claim 1, wherein the configuration comprises a first channel state information resource configuration for channel measurement and a first channel state information resource configuration interference measurement based on a first subcarrier spacing, and a second channel state information resource configuration for channel measurement and a second channel state information resource configuration interference measurement based on a second subcarrier spacing different from the first subcarrier spacing.

13. The method of claim 12, wherein the report comprises information indicating at least one subcarrier spacing value, at least one bandwidth part, or a combination thereof to be used for receiving subsequent sidelink transmissions.

14. An apparatus comprising:
a processor; and
a memory coupled to the processor, the processor configured to cause the apparatus to:
receive a configuration from a network device for a report comprising an indication of at least one subcarrier spacing value for transmitting a physical channel, receiving the physical channel, or a combination thereof;
in response to receiving the configuration, estimate the at least one subcarrier spacing value by calculating a Doppler spread, an average delay, a delay spread, a phase noise power, an inter carrier interference level, or a combination thereof; and
transmit the report comprising the indication of the at least one subcarrier spacing value.

15. An apparatus comprising:
a processor; and
a memory coupled to the processor, the processor configured to cause the apparatus to:
transmit a configuration to a device for a report comprising an indication of at least one subcarrier spacing value for transmitting a physical channel, receiving the physical channel, or a combination thereof; and
receive the report comprising the indication of the at least one subcarrier spacing value, wherein the at least one subcarrier spacing value is estimated based on a Doppler spread, an average delay, a delay spread, a phase noise power, an inter carrier interference level, or a combination thereof.

16. The apparatus of claim 15, wherein the processor is configured to cause the apparatus to receive information indicating a capability to support a set of subcarrier spacing values corresponding to a frequency band, and the at least one subcarrier spacing value indicated in the report is part of the set of subcarrier spacing values.

17. The apparatus of claim 16, wherein a size of the indication in the report is determined based on a number of subcarriers spacing values in the set of subcarrier spacing values indicated as capability information.

18. The apparatus of claim 15, wherein a size of the indication in the report is determined based on a number of bandwidth parts configured for the device and subcarrier spacing values associated with the bandwidth parts for transmission, reception, or a combination thereof.

19. The apparatus of claim 15, wherein one bandwidth part is associated with one subcarrier spacing value and the apparatus implicitly reports the subcarrier spacing value by reporting an index of a bandwidth part.

20. The apparatus of claim 15, wherein the processor is configured to cause the apparatus to transmit a subcarrier spacing table that contains at least two columns comprising an index value and at least one corresponding subcarrier spacing value.

* * * * *